Nov. 12, 1968  W. J. FLAHERTY  3,410,990
TEST SCORING MACHINES
Filed April 1, 1964  5 Sheets-Sheet 1
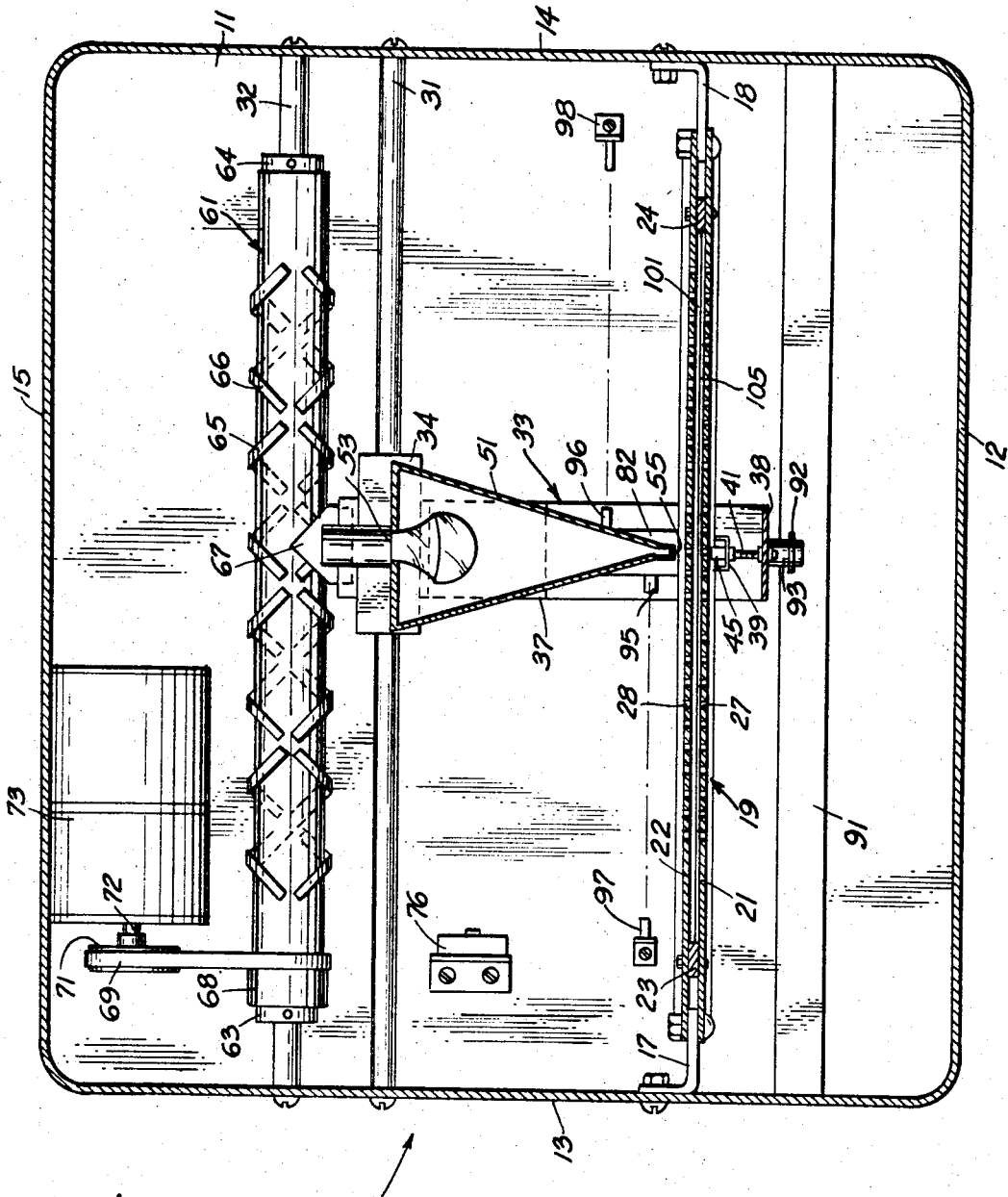
INVENTOR.
WILLIAM J. FLAHERTY
BY
Wallace, Kinzer & Horn
Attys.

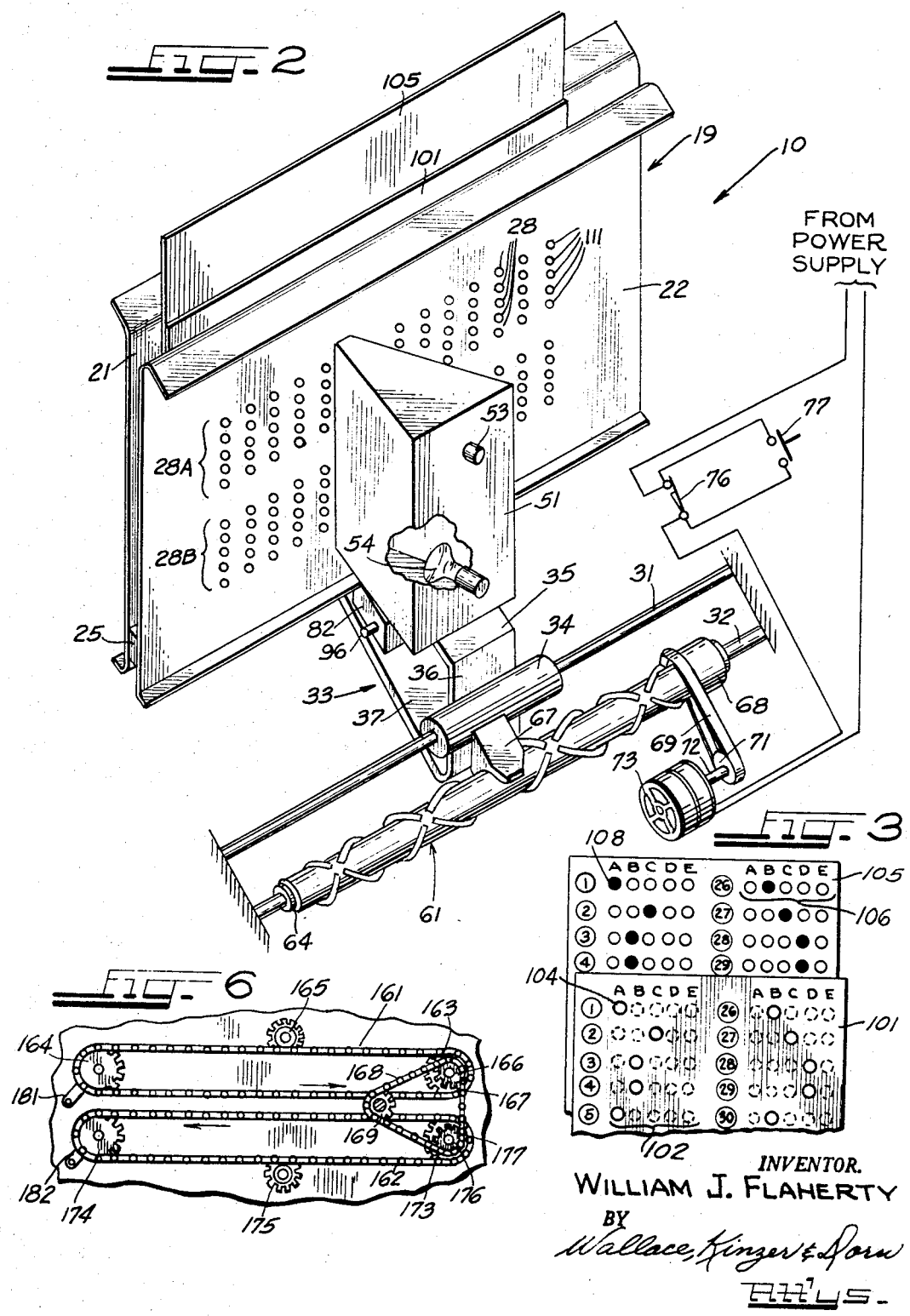

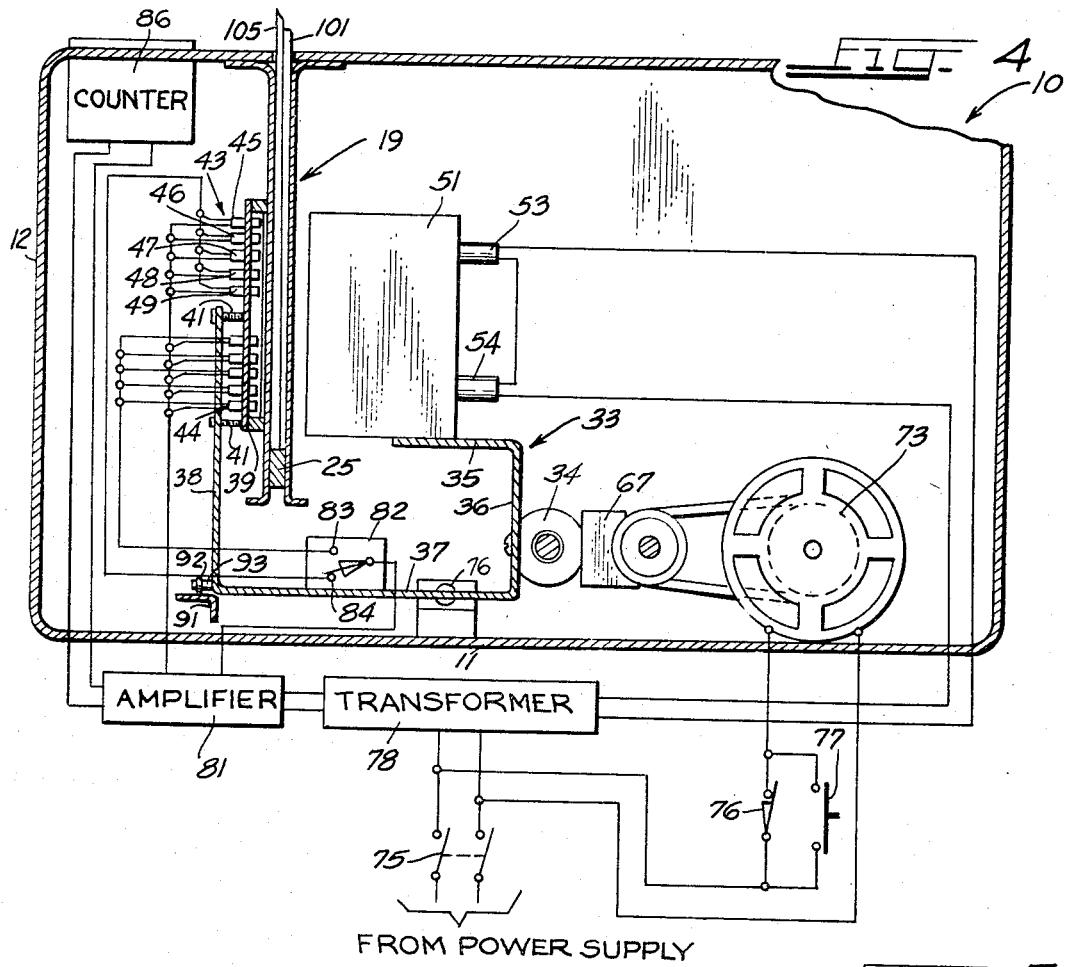
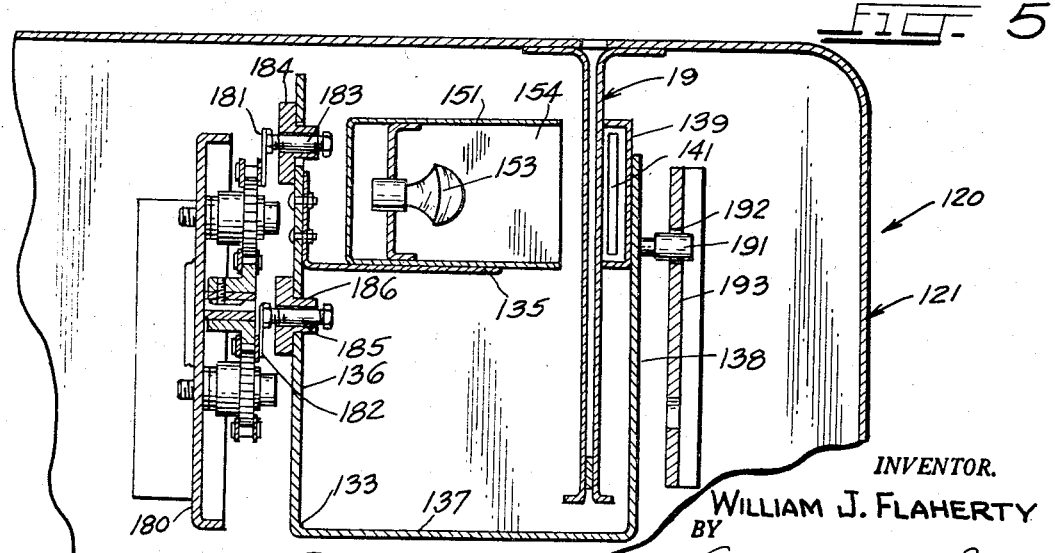

Nov. 12, 1968  W. J. FLAHERTY  3,410,990
TEST SCORING MACHINES
Filed April 1, 1964  5 Sheets-Sheet 4
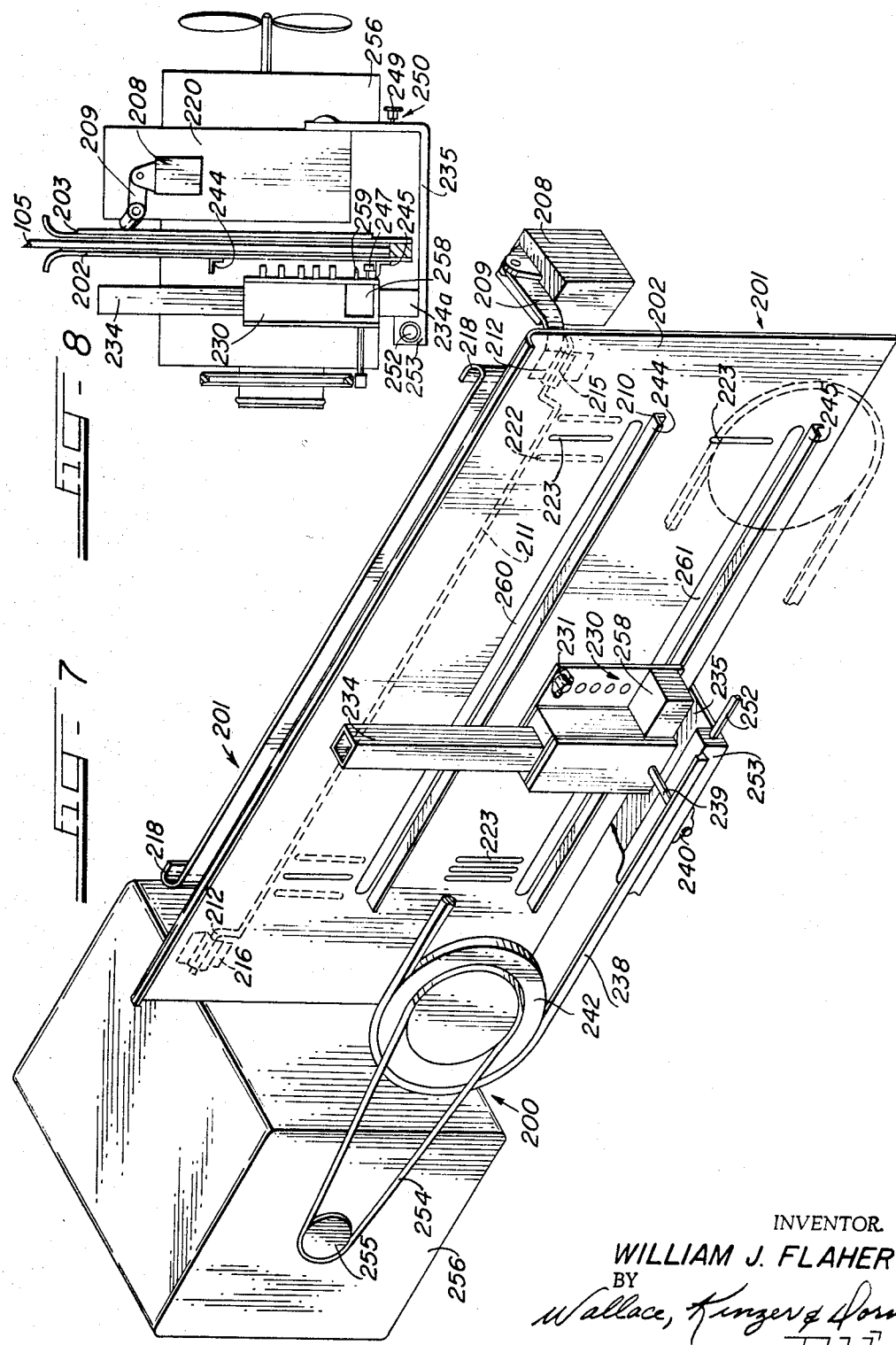
INVENTOR.
WILLIAM J. FLAHERTY
BY
Wallace, Kinzer & Dorn
ATTYS.

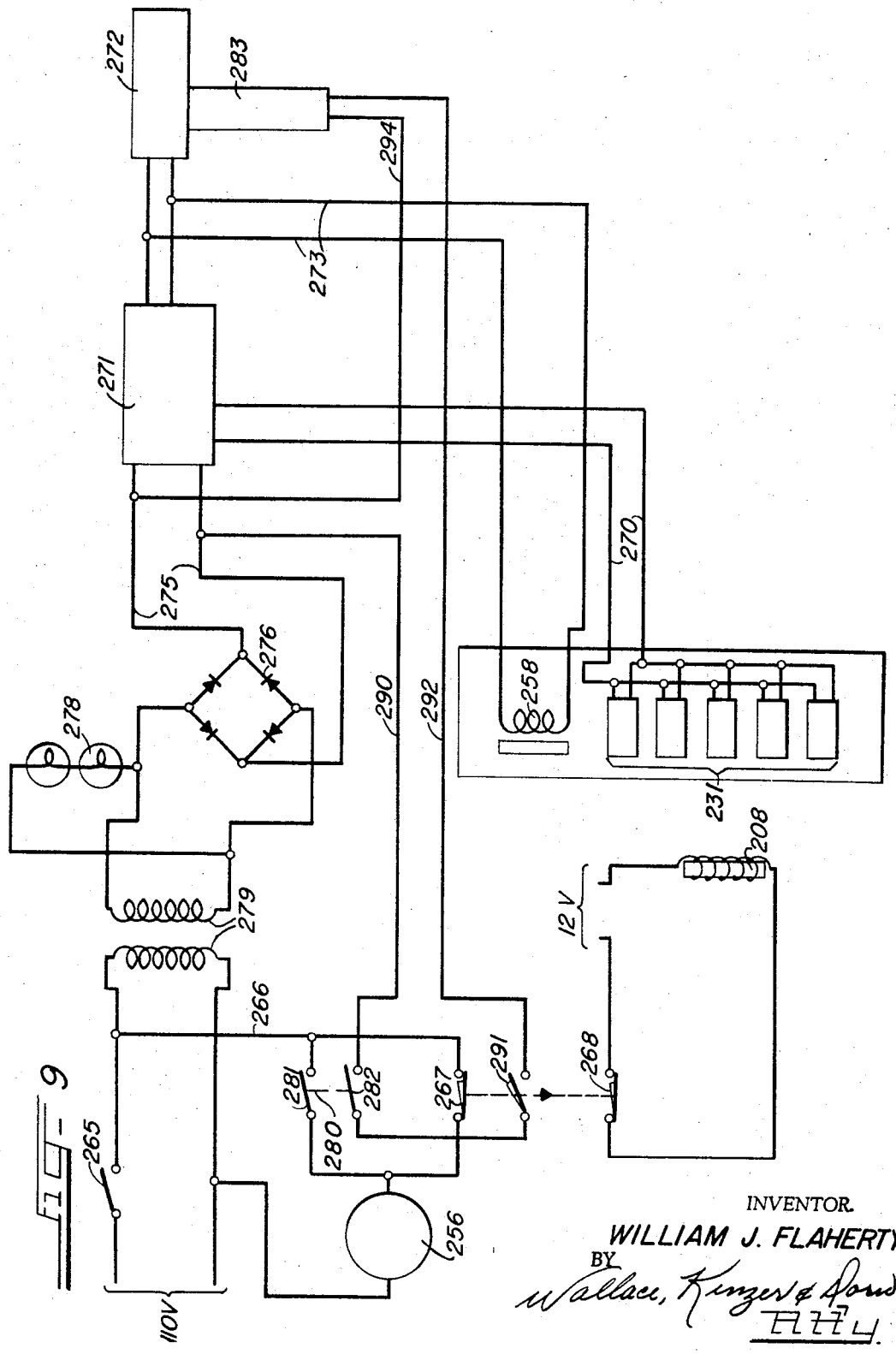

United States Patent Office 3,410,990
Patented Nov. 12, 1968

3,410,990
TEST SCORING MACHINES
William J. Flaherty, P.O. Box 272,
Viola, Ill. 61486
Filed Apr. 1, 1964, Ser. No. 356,460
6 Claims. (Cl. 235—61.6)

ABSTRACT OF THE DISCLOSURE

A test scoring machine for use with test sheets each having a plurality of answers arranged in a predetermined pattern at answer indicator areas. The machine comprises mounting means for supporting a test sheet in alignment with a perforated key mask and a carriage movable along a linear path from one end of the mounting means to the other and back again. Sensing means comprising a pair of sensing devices each having an effective sensing area corresponding to one of the test sheet answer locations is mounted on the carriage in alignment with lamps or other radiant means for irradiating a limited portion of the test scoring sheet corresponding to one of the answer locations. The machine further includes test score accumulation means and a selector for selectively connecting the accumulation means to one of the sensing devices as the carriage moves in one direction and to the other sensing device as the carriage moves in the opposite direction.

---

This invention relates to a new and improved test scoring machine and more particularly to a simple and economical scoring machine for multiple answer tests.

The increasing use of multiple-answer tests in educational and other applications has caused a substantial demand for mechanical scoring apparatus, since the volume of test papers makes scoring impractical in many instances. To some extent, this demand has been met by simple mask devices which are visually compared with the answers on the test sheets. Other scoring apparatus has entailed the use of photoelectric scanning devices or direct electrical sensing devices for comparing individual test sheets with a master sheet or with answers that have been recorded in some other form. Most of the prior art devices have either been of the simple visual-comparison type or have entailed relatively complex and expensive automatic scoring mechanisms.

It is a principal object of the present invention to provide a new and improved semi-automatic scoring machine that is rapid and effective in operation yet simple and economical in construction.

A particular object of the invention is the provision of a new and improved manually fed semi-automatic test scoring machine of maximum accuracy and capable of high speed operation.

A particular object of the invention is to increase the capacity of a manually fed test scoring machine of the photoelectric type while utilizing a minimum number of photosensitive scanning devices.

Another object of the invention is to afford a simple and accurate scanning drive for a photoelectric or other radiation-sensitive test scoring machine. A related object of the invention is to provide a high capacity photoelectric scoring machine having a linear drive arrangement to provide for maximum accuracy in operation.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawings:

FIG. 1 is a plan view of a test scoring machine constructed in accordance with one embodiment of the invention, the cover of the test scoring machine having been removed to reveal the mechanical features of the invention;

FIG. 2 is a simplified perspective view, partially schematic in form, of the main drive apparatus and associated mechanical elements of the test scoring machine of FIG. 1;

FIG. 3 illustrates one form of master sheet that may be employed in the test scoring machine;

FIG. 4 is a partial sectional elevation view of the test scoring machine of FIGS. 1 and 2, including a schematic representation of the basic electrical operating circuit;

FIG. 5 is a sectional elevation view of a different embodiment of the invention; and FIG. 6 is an elevation view of a chain drive incorporated in the apparatus of FIG. 5.

FIG. 7 is a perspective view partially simplified and schematic in form of another embodiment of the test scoring machine;

FIG. 8 is an end elevational view of FIG. 7;

FIG. 9 is a schematic representation of the basic electrical operating circuit for the test scoring machine of FIG. 7.

The test scoring machine 10 illustrated in FIGS. 1, 2 and 4, includes a base member or housing 11 of box-like configuration having a front wall 12, side walls 13 and 14, and a rear wall 15. A pair of brackets 17 and 18 are mounted upon the side walls 13 and 14, respectively (FIG. 1) and these brackets are employed to mount the test sheet support assembly 19 within the base member 11. The test sheet support assembly 19, sometimes referred to hereinafter as the test sheet mounting means, comprises a pair of guide plates 21 and 22 that are affixed at their ends to the mounting brackets 17 and 18. A pair of spacers or stop members 23 and 24 may be mounted between the guide plates 21 and 22, near the ends thereof, to afford a predetermined spacing between the guide plates and to determine the lateral alignment of a test sheet supported in the assembly 19. A further stop member 25 is mounted between the guide plates 21 and 22 near the bottom of the assembly 19 as shown in FIGS. 1, 2 and 4.

The guide plate 21 is provided with a series of apertures 27 that are aligned with a corresponding series of apertures 28 in the guide plate 22. Alternatively, the guide plates 21 and 22 may be fabricated from a transparent or translucent plastic. However, the preferred construction utilizes metal guide plates, as illustrated, the apertures 27 and 28 serving a masking purpose without interfering with photoelectric scoring as described in detail hereinafter.

A pair of fixed shafts 31 and 32 are mounted within the base member 11, being affixed to and extending between the side walls 13 and 14 in parallel spaced relation to the test sheet mounting means 19 and to each other. A carriage 33 is slidably mounted upon the shaft 31 as by means of an elongated sleeve bearing 34. The carriage 33 is of channel-shaped configuration, as viewed in elevation, and includes a horizontally extending lamp support portion 35, a vertically depending portion 36, a base portion 37 that projects beneath the test sheet mounting means 19, and a vertically projecting photoelectric mounting portion 38 that is located on the opposite side of the assembly 19 from the carriage portions 35 and 36 (see FIG. 4).

A photoelectric mount 39 is supported upon the carriage element 38 by suitable means such as a plurality of support studs 41. The photoelectric mount 39 carries two radiation-sensitive sensing devices 43 and 44. Sensing device 43, in this instance, includes five individual photocells 45, 46, 47, 48 and 49. However, all of the photocells 45–49 are connected to each other and the entire group of photocells could be replaced by a single elongated photosensitive device, if desired, as will be apparent from the operational description of the machine 10 as set forth in detail hereinafter. The photoelectric sensing device 44 is similar in construction to the device 43 and also includes five individual photocells disposed in vertical alignment and electrically connected to each other.

The arm 35 of the carriage 33 carries a lamp housing 51. The lamp housing 51 is generally triangular in configuration as seen from FIGS. 1 and 2. A pair of lamps 53 and 54 are mounted within the housing 51, in alignment with the photocell banks 43 and 44 respectively. The triangular configuration of the photoelectric housing 51 leaves a relatively narrow opening 55 facing adjacent to the apertures 28 in the guide plate 22 of the test sheet mounting means 19. This makes it possible to limit illumination of the test sheet mounting means to a single vertical row of the apertures 28. As best shown in FIG. 2, the apertures 28 are arranged in vertical rows and are grouped in an upper grouping 28A and a lower grouping 28B, the groupings 28A and 28B being aligned with the lamps 53 and 54 respectively. On the other hand, a single lamp illuminating all of the apertures 28 in a given vertical alignment may be utilized instead of the lighting arrangement illustrated in the drawings if desired.

The test scoring machine further includes a drive means for driving the carriage 33 along a predetermined scanning path. This drive means comprises a dual-thread lead screw 61 that is mounted upon the fixed shaft 32 by means of a pair of suitable bearings 63 and 64. The two threads 65 and 66 of the lead screw 61 are of equal pitch but are oppositely directed. They are engaged by a lead screw follower 67 that is affixed to the support bearing 34 of the carriage 33. The lead screw 61 is provided at one end with a pulley 68 that is engaged by a drive belt 69, the belt 69 also engaging a drive pulley 71 mounted upon the output shaft 72 of a motor 73. The motor 73 may comprise any conventional electrically driven motor, preferably including a speed reduction gear, since the rotational speed required for the lead screw 61 is relatively low.

The electrical control means for the test scoring machine 10 is best illustrated in FIG. 4, although the positions for certain components are best shown in FIGS. 1 and 2. One terminal of the motor 73 is directly connected, through a main switch 75, to a suitable power supply, which may be a conventional 110 volt single-phase supply. The other terminal of the motor 73 is connected through a limit switch 76 and through switch 75 to the second terminal of the power supply. The switch 76 is a normally closed device that is mounted in position to be engaged by the base portion 37 of the carriage 33, so that the switch is opened when the carriage is moved to the extreme left-hand end of its operating path (FIG. 1). The switch 76 is also shown schematically in FIG. 2. A starting switch 7 of the momentary contact push-button type is connected in parallel with the switch 76.

The external power supply is also connected to a transformer 78, through the switch 75. The transformer 78 is connected to the lamps 53 and 54; the lamps are shown in a series circuit connection but a parallel connection could also be used if desired. The transformer 78 is also coupled to an amplifier 81 to afford a power supply for the amplifier. It should be understood that the amplifier 81 may include suitable rectifier or other circuits, in addition to the actual amplifying circuits, depending upon the requirements of the photocells incorporated in the devices 43 and 44. The amplifier 81 is connected to each of the photocells in a circuit that includes, in one branch thereof, a selector switch 82. The switch 82 is a single-pole double-throw device having one terminal 83 connected to the photocells 45–49 of the sensing device 43. The other terminal 84 of the switch 82 is connected to the photocells incorporated in the sensing device 44. The sensing devices 43 and 44 constitute input devices for the amplifier 81. However, only one of the two sensing devices is effective at any given time, depending upon the condition of the selector switch 82. The output of the amplifier 81 is connected to an electrically actuated counter 86. The particular kind of counter selected is not critical except that it must be capable of coordinate operation with the amplifier circuit selected for the device 81. Inasmuch as suitable counting devices are well known in the art, no further description of the counter or test score accumulator 86 is incorporated herein.

For accurate operation of the test scoring machine 10, it is essential that the photoelectric sensing devices 43 and 44 be maintained in accurate alignment with the test sheet support assembly 19. In the illustrated arrangement, this is accomplished by means of a guide rail 91 that is mounted between the side members 13 and 14 of the base 11. The guide rail 91 is engaged by a guide roller 92 that is mounted upon a short shaft 93 projecting forwardly from the vertical portion 38 of the carriage 33 (FIGS. 1 and 4). The guide roller 92 rides along the rail 91 and serves to support the forward end of the carriage 33 and to maintain it in accurate alignment with the test score mounting means 19. The rear end of the carriage 33 is accurately and effectively guided by the engagement of the bearing member 34 with the fixed shaft 31.

It is also necessary to provide some means for actuating the switch 82, automatically, between its two operative positions. The switch 82 is provided with two externally projecting actuator elements 95 and 96 (see FIG. 1). A stop member 97 is aligned with the switch actuator 95 and a corresponding stop member 98 is aligned with the switch actuator 96. As the carriage 33 nears the left-hand limit of its travel (FIG. 1) the stop member 97 engages the actuator member 95 of the switch 82 to throw the switch 82 to its initial operating condition in which the switch is closed upon the terminal 84, this being the condition illustrated in FIG. 4. Movement of the carriage 33 to the extreme right-hand position thereof (FIG. 1) brings the other switch actuator 96 into engagement with the stop 98 to throw the switch to its alternate operating condition in which the switch is closed upon the terminl 83 (FIG. 4).

FIG. 3 illustrates a small portion of a master sheet 101 that may be utilized in the test scoring machine 10. As shown in FIG. 3, the master sheet 101 is provided with a series of answer locations 102 numbered to correspond to various questions on an examination. Each of the answer locations 102 includes a series of five answer indicator area 103 which may be scored in the sheet to permit ready removal thereof. Preparation of the master is completed by punching out selected ones of the answer indicator areas 103 corresponding to the correct answers to a given examination. In each instance there is one punched-out answer indicator area at each answer location, as exemplified by the opening 104 in the first of the answer locations 102. The master sheet 101 is opaque in all areas surrounding the answer locations 102 except, of course, those punched out for correct answers as at 104.

In appearance, a test sheet 105 to be scored in the machine 10 may be essentially similar to the master sheet 101 except that it is relatively translucent. That is, the test sheet 105 may comprise a thin sheet of paper suitably marked with a series of answer locations 106 corresponding to the answer locations 102 of the master sheet 101. Thus, the test sheet would also include a plurality of answer locations arranged in the same pattern as the answer locations on the master sheet and each including a predetermined number of answer indicator areas 107 similar to the answer indicator area 103 of the sheet 101. Test answers are indicated on the answer sheet by marking the selected answer indicator area in each answer location to render it opaque, using pencil, ink, or any other suitable means.

In operation of the machine 10, a pre-punched master sheet 101 is deposited in the test sheet mounting assembly 19 adjacent the guide plate 22. The position of the test sheet 101 within the assembly 19 is determined by the stop members 23–25. A test sheet 105 to be scored is deposited in the assembly 19 in alignment with the mask or master sheet 101. The machine is made ready for operation by closing the main switch 75. At the outset, in considering operation of the machine, it may be assumed that the carriage 33 is located at its starting position, this being the extreme right-hand limit of movement of the carriage as seen in FIG. 2 and the extreme left-hand position in the view of FIG. 1. Consequently, the base portion 37 of the carriage is disposed in engagement with the limit switch 76 and holds the limit switch open, so that the motor 73 is not energized.

To start a scoring cycle, the start switch 77 is closed momentarily. When this switch closes, the motor 73 is effectively connected to the power supply through the switch 77 and the main switch 75. Accordingly, the lead screw 61 is rotated with the result that the follower 67 drives the carriage 33 along the lead screw toward the other end of its travel, near the bearing 64.

As the carriage 33 is driven along the lead screw 61, a scoring operation is carried out with respect to the upper group of test answers, which are aligned with the apertures 28A in the guide plate 22. Thus, as the carriage 33 moves along the lead screw, moving away from the limit switch 76, the lighting unit 51 first comes into alignment with the initial answer location apertures 111 corresponding to answer indicator areas in the first answer location in the master sheet 101 and the test sheet 105. If the correct answer has been marked on the answer sheet 105, the answer location 108 in alignment with the one answer indicator area 104 that is punched out in the master sheet 101, all of the apertures 111 are effectively blocked by either the master sheet or the test sheet. Consequently, the light passing through the apertures 111 in the guide plate 22 and on through the corresponding apertures in the other guide plate 21 is negligible. The operating conditions of the photocells aligned with the apertures on the opposite side of the test sheet mounting means 19 from the light source 51 are not materially changed and no signal is supplied to the counter 86.

On the other hand, the person that has filled out the test sheet 105 may have failed to darken the correct answer indicator area 108 in the first answer location on the test sheet. If this is the case, a substantial amount of light passes through the aperture 104 in the master sheet and through the test sheet area 108 and impinges upon one of the photocells 45–49 in the photoelectric sensing device 43. Under these circumstances, a pulse signal is supplied from the illuminated photocell to the amplifier 81 and from the amplifier 81 to the counter 86 (FIG. 4). This process is repeated for each answer location defined by the upper group of guide plate apertures 28A as the carriage 33 taverses the length of the lead screw 61. When the carriage reaches the end of its movement, scoring of the upper half of the test sheet 105 is complete and the counter 86 has been pulsed once for each incorrect answer on the test sheet 105 in the column of answer locations corresponding to the left-hand group of answer locations as shown in FIG. 3.

During the initial movement of the carriage 33, as noted hereinabove, the switch 82 is maintained in the position shown in FIG. 4. With the switch 82 in this position, only the sensing device 43 is effectively coupled to the amplifier 81. Accordingly, illumination of any of the photocells in the second sensing device 44 is ineffective to produce scoring signals that might be transmitted to the counter 86. When the carriage 33 nears the end of its travel away from the limit switch 76, however, the actuator 96 on the switch 82 engages the stop member 98 to throw the selector switch to its alternate operating position. Actuation of the switch 82 in this manner effectively disconnects the sensing device 43 from the scoring circuit and connects the second sensing device 44 into the scoring circuit.

The double-thread construction for the lead screw 61 causes the follower 67 to reverse its movement at a point near the end of the lead screw adjacent the bearing 64. Consequently, the follower 67 is driven back toward the limit switch 76, thereby reversing the direction of movement of the carriage 33 and causing it to follow a return path back toward the limit switch 76. On the return movement of the carriage, the same scoring procedure as outlined above is carried out with respect to the test sheet answer locations that are aligned with the lower group 28B of the apertures 28 in the guide plate 22. Again, the scoring circuit counts wrong answers, a wrong answer being defined as any answer marking in which the correct answer indicator area is not darkened. It is thus seen that the drive means comprising the motor 73, the belt 69, and the lead screw 61 is effective to drive the carriage 33 from a starting position adjacent the limit switch 76 along a reciprocating scanning path that terminates at the initial starting position to scan the answer locations on the test sheet 105 in sequence. Moreover, the sensing apparatus of the machine 10 is in continuous operation virtually throughout the scanning movement of the carriage 33, since one-half of the test sheet answers are scanned on the first movement of the carriage 33 and the remaining half are sensed on the return movement.

As soon as the carriage 33 reaches its initial position it engages and opens the limit switch 76. This effectively de-energized the drive motor 73 and interrupts movement of the carriage 33. The test sheet 105 is then removed from the mounting means 19 and the score of wrong answers registered on the counter 86 may be written on the test sheet. In addition, return movement of the carriage brings the actuator 95 of the selector switch 82 into engagement with the stop member 97 (FIG. 1). This actuates the selector switch 82 back to its original operating condition, illustrated in FIG. 4, again connecting the first sensing device 43 into the scoring circuit. It is thus seen that the scoring machine 10 is restored to its original operating condition and is ready to score another test sheet when the carriage reaches its starting position, the only other operation necessary being resetting of the counter 86.

In some instances, it may be desirable to utilize test sheets of a somewhat different construction than described hereinabove. For example, the test sheet may be made identical in construction to the master sheet 101, and accordingly, may be of opaque material provided with pre-scored answer indication areas such as the answer indicator areas 103. Answers are recorded in this kind of test sheet by punching out individual answer indicator areas such as the area 104 of the master sheet 101.

The scoring procedure, in operation of the machine 10, is the same as before except that in this instance correct answers are counted instead of incorrect answers. Thus, in any instance where the correct answers has been punched out of the test sheet, a clear path is established for the transmission of light from the radiation source 51 through the apertures 28 in the guide plate 22, the apertures in the master sheet 101 and 105, and the corresponding apertures in the guide plate 21. On the other hand, in those instances where there is no aperture in the test sheet at the location corresponding to the correct answer, light transmission is blocked. Thus, the sensing devices 43 and 44 are illuminated and, accordingly, develop pulse signals, only in those instances where a correct answer has been punched out of the test sheet.

In some instances, it may be desirable to utilize the selector switch 82 to control illumination as well as to control the operating connections for the sensing devices 43 and 44. To this end, the device 82 may be constructed as a double-pole double-throw switch and may be arranged to energize only the one of the light sources 53 and 54 that is aligned with the sensing device rendered operative in the course of movement of the carriage 33 in a given direction. If this is done, it is of course necessary to provide a barrier within the housing 51, between the lamps 53 and 54, to limit each lamp to illumination of only one answer location at any given time. However, it is usually sufficient to control the electrical connections to the photoelectric sensing elements and, indeed, a single light source may be utilized is desired.

It is not necessary to employ a series of individual photocells in either of the sensing devices 43 and 44. Instead, a single elongated photocell having an effective area long enough to encompass a complete answer location may be employed. On the other hand, if it is desired to revise the scoring circuit to provide for more complex scoring, as for example a right-minus-wrong scoring arrangement, individual photocell arrangements may be required. One circuit system, entailing the use of a slightly different master sheet, that may be employed to adapt the test scoring machine 10 for right-minus-wrong scoring is described and claimed in the co-pending application of William J. Flaherty and Gerald J. Gootee, Ser. No. 120,898, filed June 26, 1961. The present invention is not dependent upon the use of any particular scoring scheme, and revisions in this portion of the machine 10 may be made to accommodate the scoring requirements of any particular test. By the same token, it is not essential to utilize light in the visible spectrum as the sensing medium; other forms of radiation sources may be used together with appropriate sensing elements.

FIGS. 5 and 6 illustrate a somewhat modified scoring machine 120 that comprises a further embodiment of the present invention. The housing 121 for the machine 120 may be essentially similar to the housing 11 of the machine 10. Furthermore, the machine 120 may include a test sheet support assembly 19 essentially similar to that incorporated in the first-described embodiment of the present invention.

The test scoring machine 120 includes a carriage 133 comprising a horizontally extending lamp support portion 135, a vertical portion 136, a base portion 137, and a vertical photoelectric mounting portion 138. A photoelectric mount 139 is affixed to and carried by the carriage member 138. The photoelectric mount 139, in this embodiment, carries only one radiation-sensitive sensing device comprising an elongated photocell 141.

The horizontal arm 135 of the carriage 133 carries a light source comprising a lamp housing 151 within which a single lamp 153 is mounted. Except for the vertical extent of the lamp housing 151, the illuminating means incorporated in the machine 120 is essentially identical to that of the previously described scoring machine 10. That is, the housing 151 is again preferably limited at the outlet end 154 so that only one answer location is illuminated at any given time in a scoring operation.

The drive means for the carriage 133, in the embodiment of FIGS. 5 and 6, is quite different from the lead screw employed in the scoring machine 10. The drive means in this embodiment of the invention comprises an upper drive chain 161 and a lower drive chain 162. The chain 161 engages a drive sprocket 163 and, at its opposite end, an idler sprocket 164. An adjustable tensioning sprocket 165 is provided at the center of the chain intermediate the sprockets 163 and 164. The sprocket 163 is mounted on the same shaft 166 with an additional sprocket 167 that is engaged by a drive chain 168.

The lower drive chain 162 is similar, and engages end sprockets 173 and 174 and a tensioning sprocket 175. The sprocket 173 is mounted on a shaft 176 that carries a sprocket 167 engaged by the drive chain 168. The chain 168 may be driven from a separate sprocket 169 that in turn is driven from a suitable motor such as the motor 73 of the first-described embodiment. The entire chain assembly may be supported upon a fixed mounting plate 180 that extends between the two side walls of the housing or base member 121.

A chain pivot support 181 is affixed to one of the links of the upper drive chain 161 and a similar chain pivot support 182 is mounted in alignment with the pivot support 181 but on the lower chain 162. A short shaft 183 is affixed to and projects from the chain pivot support 181; the shaft 183 carries a bearing sleeve journalled in a bearing member 184 that is mounted in the vertical member 136 of the carriage 133. Similarly, a short shaft 185 is secured to the lower chain pivot support 182 and this shaft carries a sleeve that is journalled in a bearing member 186 mounted in the vertical portion 136 of the carriage.

The starting position for the carriage mechanism of FIGS. 5 and 6 may be taken as that indicated by the position of the chain pivot supports 181 and 182 in FIG. 6. When the drive sprocket 169 is rotated in a counterclockwise direction, the chains 161 and 162 are driven in the directions indicated in FIG. 6. Thus, initially, the pivot supports 181 and 182 move across the machine from left to right, as seen in FIG. 6, along the lower runs of the two chains. Subsequently however, the pivotal support members 181 and 182 traverses a return path along the upper sections of the two chains. It is thus seen that the carriage 133 is driven along a reciprocating scanning path that begins and terminates at the starting position indicated by the location of the support members 181 and 182 in FIG. 6. The major portion of each section of this path is linear. However, the elevation of the carriage is changed, in each instance, at the end of the path. Consequently, although the test scoring machine 120 includes only one source of illumination and a single sensing device, and although the sensing device covers only one group of answer locations, the entire test sheet can be scanned, one-half of the answer locations being sensed as the carriage moves in one direction from the starting position and the remaining answer locations being scanned on the return movement of the carriage.

In this arrangement, it is of course desirable to provide some means for guiding the carriage 133 for relatively precisely controlled movement with respect to the test sheet mounting assembly 19. It is also desirable to afford adequate support for the portion of the carriage 133 that carries the sensing device 141. To this end, guide roller 191 may be mounted on the carriage 133 in engagement with a guide slot 192 in a suitable fixed guide member 193. Other suitable guiding arrangements may be utilized if desired.

FIGS. 7 and 8 illustrate a further embodiment of the present invention which is adapted to be disposed in a housing similar to the housing 11 for the machine 10 of the embodiment of FIGS. 1–4, inclusive. The test scoring machine 200 of FIGS. 7 and 8 includes a test sheet support assembly 201, FIG. 7, having a fixed guide plate 202 spaced from and adjacent to a movable guide plate 203. A test sheet 105 is inserted in the space or cavity 205 between the guide plates 202 and 203 and is clamped into position by the movable guide plate 203 moving toward the fixed guide plate 202 to hold the test sheet 105 against the fixed guide plate 202. The guide plate 203 is selectively moved to a clamping position upon energization of a solenoid 208 to pivot a bell crank 209 to rotate a crank or camming rod 211 to move its central portion about the offset ends 212 of the camming rod 211 inserted into spaced brackets 205 and 216 secured to the fixed guide plate 202 outside of the longitudinal area of the movable guide plate 203.

The movable guide plate 203 has its opposed end portions formed into inwardly directed hooks 218 to receive a master sheet 101 which is encoded with the proper test answers in the manners hereinbefore described.

With a master sheet disposed between the hook ends 218 and a test answer sheet disposed in the space 205, the correct answer will be ascertained by the absence or presence of light or other forms of radiant energy passing through the aligned sheets at answer locations. In this embodiment of the invention a lamp housing 220, FIG. 8, containing a lamp directs light to a vertically extending slot 222 in the movable guide plate 203, there being an aligned matching slot 223 in the fixed guide plate 202 for each of the slots 222 and the movable guide plate 203. As apparent from FIG. 7, the slots 222 and 223 are grouped in rows with an upper row of slots corresponding to a first row of answers, and a lower row of slots corresponding to a lower row of answers on the test sheet 105.

For the purpose of detecting the presence or absence of light at an answer location coming through the aligned master sheet 101, guide plates 202 and 203, and answer sheet 105, there is provided a photo-sensing device 230, which has five photo cells 231 spaced vertically in a manner corresponding to the spacing between each of the five answer positions in an answer column or location on the test sheet 105.

The photo-sensing device 230 is vertically movable on a square guide post or column 234 between the top row of answer locations and the bottom row of answer locations. The column 234 has its lower end secured to a carriage 235 (FIG. 8) which also carries the lamp housing 220. An endless band or belt 238 is secured by a rod 239 which is fixedly secured to the sensing device 230, so as to pull the sensing device 230 and the carriage 235 along past the columns of answer locations. The end of the rod 239 is inserted in an aperture in a clamp 240 secured to the belt 240. The clamp 240 is adapted to rotate about the rod 239 as the clamp 240 is carried by the belt 238 about a pulley 242. Thus, as the clamp 240 moves with the belt 238, the sensing device 230 and carriage 235 are pulled along therewith, and as the clamp 240 moves vertically the sensing device 230 moves vertically with the clamp 240. For instance, when the clamp 240 moves about the left end pulley 242, the shaft 239 rises and lifts the sensing device 230 upwardly on the column 234 to the sensing position for the top row of slots 223.

The sensing device 230 is guided in its reciprocal movement along the upper row of slots by an angle shaped support 244 attached to the outer surface of the fixed guide plate 202. As best seen in FIG. 8, the photo sensing device 230 carries a shaft with a roller 247 shown riding along the top surface of a lower angle shaped support 245. Thus, it will be understood that on the upper and reverse movement of the sensing device 230 that the roller 247 rides along the upper surface of the support 244; and that on the lower and forward movement of the photo-sensing device 230 the roller 247 rolls on the lower support 245.

As best seen in FIG. 8, the carriage 235 has a supporting roller 249 disposed to rotate over a longitudinally extending angle 250 as the carriage 235 reciprocates past the test sheet support assembly 201. It is to be noted that the lower end 234A of the column 234 is secured to carriage 235 and that only the sensing device 230 partakes of vertical movement to move its photo cells 231 between the upper and lower rows of answer locations. In addition to the roller 249 for guiding the carriage 235 on lamp side of the test sheet, a fixed guide rod 252 is disposed on the opposite or photo-sensing side of the carriage 235. The guide rod 252 receives an apertured or bored end portion 253 in the carriage 235.

The driving pulley 242 is driven by a belt 254 extending about its driving pulley 255, which is rotated by a motor 256. As hereinbefore noted, the motor 256 can either be of a slow speed or a suitable speed reduction can be accomplished as for example, by selectively changing the size of the pulleys 255 and 242.

The sensing device 230 carries a marking solenoid 258 disposed immediately beneath the photocells 231 for the purpose of marking the test sheet with an ink mark at the location of a wrong answer. More specifically, the marking solenoid 258 has a plunger 259, FIG. 8, carrying an inked tip or end portion which is adapted to be inserted through either an upper slot 260 or lower slot 261 formed in the fixed guide plate 202. The other guide plate 201 serves as a platen for supporting the marking of the wrong test answer by the tipped plunger 25a immediately below the answer column. Preferably, the plunger 259 of the marking solenoid 258 is disposed vertically in alignment with the sensing photocells 231 so as to mark an answer location as it is being examined for a wrong answer.

The operation of the embodiment of the invention shown in FIGS. 7 and 8 can best be understood in conjunction with an explanation of the electrical control circuit therefor shown in FIG. 9, wherein operation of the test scoring machine is initiated by depressing a push button 280, the main switch 265 having already been closed to connect the test scoring machine to the 110 volt power source. Closure of the push button 280, closes its normally open contact 281 to complete an energizing path for the motor 256 over a circuit including main switch 265, lead 266, now closed contacts 281, motor 256 and the 110-volt source. The push button 280 only momentarily closes the contacts 281 to energize the motor 256 for a period sufficient to move the carriage 235 from its starting position to permit a limit switch contact 267 to complete a holding circuit for motor 256 over lead 266 and now closed contacts 267.

When the carriage 235 is in a right hand position, as shown in FIG. 7, the carriage 235 holds open limit switches 267 and 268. As the carriage 235 begins to move leftwardly, the limit switch 268 also closes and completes an obvious circuit from a 12-volt supply source to the energizing coil of the clamping solenoid 208, FIG. 9, whereupon the camming shaft 210 turns and forces the movable guide plate 201 to clamp the answer sheet against the fixed guide plate 202.

As the motor 256 turns, the motor causes the driving belts 254 and 238 to move and thereby to move the sensing device 230 and lamp housing 220 to the first of the series of lower answer locations at a slot 223. If the answer on the test sheet 105 is correct, the master sheet 101 blocks selected areas of the slots 222 and 223 from receiving light, and the darkened pencil mark of a correct answer prevents light from reaching any of the photocells 231 associated with the correct answer location. Thus, none of the photocells detect light and none generate an electrical pulse. Conversely, if the correct answer location is not marked, the photocell 231 associated with the correct answer location receives light and generates a signal which goes over leads 270, FIG. 9, to an amplifier 271, wherein the pulse is amplified to pulse an error counter 272. The amplifier 271 also sends a pulse over leads 273 to momentarily energize the coil of the marking solenoid 258. The marking solenoid 259 inserts its plunger through the slot 261 to mark the test answer location on the test sheet 105 with an ink mark. The amplifier 271 receives rectified power over leads 275 from the bridge 276 which rectifies the AC power from transformer 279 that causes lamps 278 to light so long as the main switch 265 is closed.

When the sensing device 230 and lamp housing 220 near the end of the reverse reciprocation along the upper series of answers, the carriage 235 engages the normally closed switches 267 and 268 and moves them to their open positions thereby breaking the holding path for the electric motor 256 through limit switch 267 and breaking the energizing path for the solenoid 208 through the limit switch 268. The motor 256 stops and the solenoid 208 de-energizes and a biasing spring (not shown) forces the movable guide plate 203 to its spaced position from the fixed guide plate 202 to release the answer sheet 105, which can then be removed and the total number of errors noted from the counter 272 and the location of a wrong answer noted from the ink marks.

In order to correct the next test sheet, the test sheet is placed in the machine and the cycling and re-set switch 280 is again operated to close switches 281 and 282 to energize momentarily the motor 256 over a circuit previously traced and to complete a reset circuit for a counter reset 283, FIG. 9. With the contacts 282 momentarily closed by operation of the push button 280, the reset circuit the counter reset 283 is completed from the lower transformer lead 275, lead 290, now closed contacts 282, now closed limit switch contacts 291, lead 292, reset device 283, and lead 294 to the upper transformer lead 275. Thus, the reset device 283 is momentarily energized to zero the counter 272. The motor 256 remains energized over its holding circuit through limit switch 267 as the carriage moves leftwardly from its starting position and the new operating cycle continues until the carriage moves sufficiently to open the limit switch 267.

Hence, while preferred embodiments of the invention have been described and illustrated, it is to be understood that they are capable of variation and modification.

I claim:

1. A test scoring machine for scoring test results from a test sheet having a plurality of answer locations arranged in a predetermined pattern and each including a predetermined number of answer indicator areas, said machine comprising:
   test sheet mounting means for supporting a test sheet in predetermined alignment with a perforated key mask representative of test answers;
   a carriage;
   radiation-sensitive sensing means, comprising a pair of sensing devices, each having an effective sensing area corresponding to one of said test sheet answer locations, mounted on said carriage;
   radiant means for irradiating a limited portion of said test scoring sheet, mounted on said carriage;
   drive means for driving said carriage from a starting position along a linear scanning path and back along the same path to the starting position to scan, in sequence, the answer locations on a test sheet supported in said mounting means, said drive means comprising a double-thread lead screw and a follower mechanically connecting the carriage to said lead screw;
   test score accumulation means for registering a test score;
   and control means for arresting said drive means each time the carriage reaches said starting position, said control means further including switching means for connecting one of said sensing devices to said accumulation means as said carriage moves away from said starting position and for connecting the other sensing device to said accumulation means during the return movement of said carriage.

2. A test scoring machine for scoring test results from a test sheet having a plurality of answer locations arranged in a predetermined pattern and each including a predetermined number of answer indicator areas, said machine comprising:
   test sheet mounting means for supporting a test sheet in predetermined alignment with a perforated key mask representative of test answers;
   a carriage, movable along a linear path from one end of the test sheet mounting means to the other and back again;
   radiation-sensitive sensing means, comprising a pair of sensing devices each having an effective sensing area corresponding to one of said test sheet answer locations, mounted on said carriage;
   radiant means, mounted on said carriage in alignment with said sensing devices, for irradiating a limited portion of said test scoring sheet corresponding in width to only one of said answer locations;
   test score accumulation means;
   and selector means for selectively connecting said accumulation means to one of said sensing devices as said carriage moves in one direction along said path and to the other sensing device as said carriage moves in the opposite direction along said path.

3. A test scoring machine according to claim 2 in which said mounting means includes a pair of guide plates each provided with a plurality of openings corresponding to the answer locations on the test sheet, at least one of said guide plates being movable relative to the other to clamp said test sheet against the other guide plate, and in which said radiation sensitive sensing means is mounted on said carriage closely adjacent one of said guide plates.

4. A test scoring machine according to claim 3 and further comprising marking means movable with said carriage past said answer locations and selectively actuatable by said sensing means to mark answer locations on said test sheet, through an opening in one of said guide plates, with a mark signifying an error, the other of said guide plates serving as a platen for said marking means.

5. A test scoring machine according to claim 2 and further comprising marking means movable with said carriage past said answer locations and selectively actuatable by said sensing means to mark answer locations on said test sheet with a mark indicative of an error.

6. A test scoring machine for scoring test results from a test sheet having a plurality of answer locations arranged in a predetermined pattern with a plurality of rows of answer locations, said machine comprising:
   a test sheet support assembly for supporting a test sheet, said test sheet support assembly including a fixed guide plate and a movable guide plate;
   a carriage including a vertical guide column;
   radiation-sensitive sensing means mounted on said carriage and guided for sliding vertically by said guide column, said sensing means being movable between an upper position corresponding to a first row of answer locations and a lower position corresponding to a row of answer locations;
   radiant means, for irradiating a limited portion of said test scoring sheet, mounted on said carriage;
   an endless belt means for driving said carriage along a reciprocating lower path and upper path past the rows of upper and lower answer locations on the test sheet supported in said mounting means;
   test score accumulation means, connected to said sensing means, for registering a test score; and
   control means for automatically arresting said drive means each time the carriage reaches said starting position.

References Cited

UNITED STATES PATENTS

| | | | |
|---|---|---|---|
| 2,261,542 | 11/1941 | Dickinson et al. | 235—61.11 |
| 2,294,679 | 9/1942 | Maul | 235—61.11 |
| 2,934,263 | 4/1960 | Patnode | 235—61.6 |

DARYL W. COOK, *Primary Examiner.*